United States Patent [19]

Robinson et al.

[11] 4,234,263
[45] Nov. 18, 1980

[54] JOINT UNIT PROVIDING MULTIPLE JOINTS

[76] Inventors: Ward T. Robinson, 68b Creyke Rd.;
Richard H. Nokes, 27 Tuirau Pl.,
both of Christchurch, New Zealand

[21] Appl. No.: 4,477

[22] Filed: Jan. 18, 1979

[30] Foreign Application Priority Data

Jan. 30, 1978 [NZ] New Zealand ............... 186340
Jul. 11, 1978 [NZ] New Zealand ............... 187831

[51] Int. Cl.³ .................... B25G 3/00; F16B 1/00
[52] U.S. Cl. ........................ 403/405; 403/56;
403/219; 35/18 A; 46/23; 46/26
[58] Field of Search ............ 403/217, 219, 405, 56;
35/18 A; 46/29, 28, 26, 23

[56] References Cited

U.S. PATENT DOCUMENTS

| | | | |
|---|---|---|---|
| 2,846,809 | 8/1958 | Majewski | 35/18 A X |
| 2,962,820 | 12/1960 | Petersen | 35/18 A |
| 3,355,820 | 12/1967 | Brumlik | 35/18 A |
| 3,554,584 | 1/1971 | Brumlik | 35/18 A X |
| 3,694,954 | 10/1972 | Brumlik | 35/18 A X |

*Primary Examiner*—Wayne L. Shedd
*Attorney, Agent, or Firm*—Cushman, Darby & Cushman

[57] ABSTRACT

A joint unit which provides a cluster of up to six ball-and-socket joints. The balls of the ball-and-socket joints are arranged as, or as part of, a substantially close-packed cluster, and a binder supports the balls in position and provides a socket for each ball.

The joint unit provides multiple ball-and-socket joints concentrated into a small volume, and is useful for many different applications, but especially for making crystallographic, geometric or molecular models.

14 Claims, 6 Drawing Figures

JOINT UNIT PROVIDING MULTIPLE JOINTS

BACKGROUND OF THE INVENTION

1. Field of the Invention

The present invention relates to a joint unit which provides a cluster of up to six ball-and-socket joints.

The joint unit of the present invention was devised for making crystallographic, molecular, or geometrical models, and will be described with especial reference to this type of application. However, it is emphasised that the joint unit of the present invention can be used for any application which requires a cluster of ball-and-socket joints concentrated into a small volume: e.g. as a component of toys or jewellery.

2. Description of Prior Art

It is known to form crystallographic and molecular models from spheres (representing atoms or molecules) connected together by rods (representing interatomic or intermolecular vectors). The spheres and rods are made in a range of sizes but the angle between sphere and rod cannot be varied. A device of this type is disclosed in U.K. Pat. No. 1,256,982 (B. H. Nicholson).

BRIEF SUMMARY OF THE INVENTION

An object of the present invention is the provision of a joint unit which permits the construction of such models (among other items) in which the angle between the rod and the joint unit can be varied over a wide range and in which up to six rods, all independently movable, can be connected to a single joint unit.

The present invention provides a joint unit providing up to six ball and socket joints and comprising: up to six balls arranged as, or as part of, a substantially close-packed cluster; and a binder supporting said balls in position and providing a socket for each ball.

Preferably, said joint unit provides six ball-and-socket joints, and the balls of these joints are arranged as a substantially close-packed octahedral cluster i.e. such that if the centre of the ball of each joint is joined to each adjacent centre, the joining lines form the edges of an octahedron.

Said binder may comprise four plugs arranged one at each vertex of a tetrahedron, each plug being connected to the other three plugs by connector members, and each plug providing three equidistantly-spaced part-sockets such that each pair of adjacent part-sockets provided by two adjacent plugs together provides one of the six sockets of the six ball-and-socket joints.

Alternatively, said binder may comprise a cube divided into identical halves along a body diagonal, said halves being releasably secured together and each said half being shaped to provide three major socket portions and three minor socket portions; said socket portions being arranged such that each socket is formed from a major socket portion provided by one half and a minor socket portion provided by the other half.

By way of example, two embodiments of the present invention are described in detail with reference to the accompanying drawings.

DETAILED DESCRIPTION OF THE PREFERRED EMBODIMENTS

Figure 2:
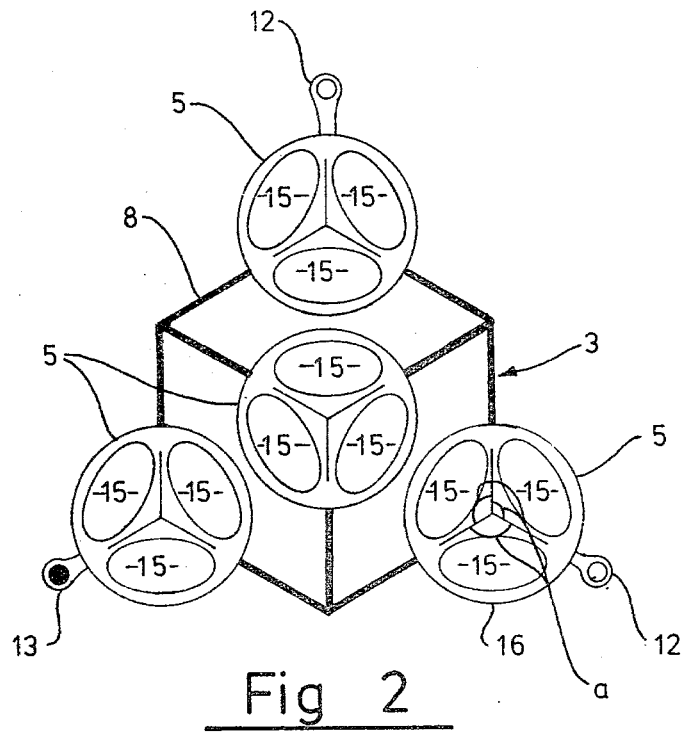
FIG. 2 shows a plan view of the binder of the FIG. 1 joint unit.
Figure 1:
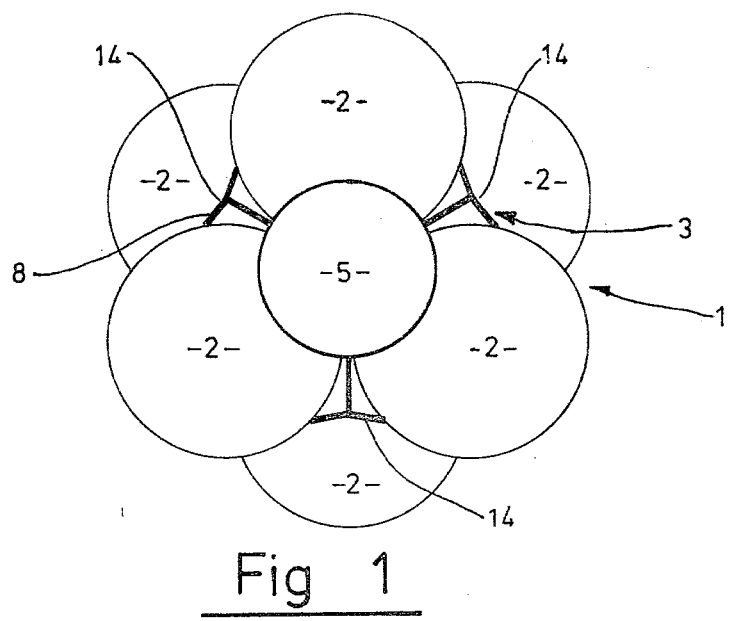
FIG. 1 shows a plan view of an assembled joint unit in accordance with a first embodiment of the invention.
Figure 3:
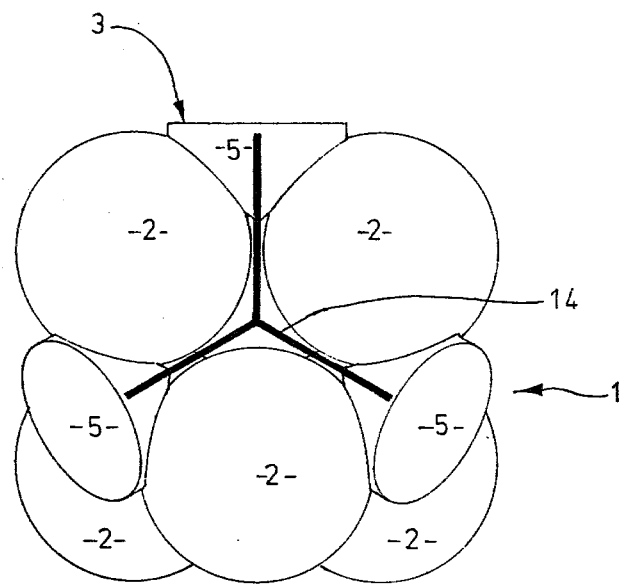
FIG. 3 shows a side view of the unit of FIG. 1.

Referring to FIGS. 1-3, a joint unit 1 comprises six balls 2 arranged in a near-close-packed octahedral cluster, the balls 2 being held in position by a binder 3 which provides the sockets for the ball-and-socket joints in the cluster. The binder 3 is made of a tough, slightly resilient material such as stiff rubber. The binder 3 comprises (in plan) four plugs 5 arranged at the centre and at every second corner of a regular hexagon. Each plug 5 is provided with three equidistantly-spaced connection members 8 of equal or nearly equal length which extend outwards from the plug to meet at the other corners of the hexagon, and connect the plugs together. On the three plugs located at the corners, one connection member 8 of each plug is in the form of a releasable fastening device.

As shown in FIG. 2, said fastening devices comprise an apertured flap 12 secured to two of the plugs and a rod secured to a flap 13 on the third plug. When the rod is inserted through each of the apertures, the binder is closed. The connection members 8 are positioned and dimensioned such that when the binder 3 is closed, the plugs 5 lie one at each corner of a tetrahedron and the connections 14 between the members 8 and the connection (not shown) formed by the fastening devices, lie near but outside each face-centre of the tetrahedron. In fact, said connections lie at the vertices of a second tetrahedron of the same size as that formed by the plugs 5. The vertices of the two tetrahedra together form the corners of a cube.

Each plug 5 provides three part-sockets 15 equidistantly spaced i.e. in plan the angles a are each 120°. Each part-socket 15 provides a concave part-spherical surface of the same radius of curvature as the external surface of each ball 2. When the binder 3 is closed, (see FIG. 1) each ball 2 seats in two cooperating part-sockets 15. The area of each part-socket 15 must be sufficiently great to provide an adequate frictional grip on the ball located therein, because when the ball is rotated relative to the socket to any given position, the ball is held in that position only by the friction between the concave surfaces of both of the corresponding part-sockets 15 and the parts of the ball's surface in contact with said part-sockets. The frictional grip between each ball and the corresponding part-sockets can be increased or decreased by respectively roughening or smoothing the surface of the ball or the concave surface of the part-sockets and/or by respectively increasing or decreasing the area of each part-socket. Within the limits just described, the more material (external to the part-sockets) that can be removed from each plug 5, the better, because this allows a ball connected to other joint units to turn through greater angles relative to the socket.

The parts of each plug 5 which do not provide the part-sockets 15 may be shaped as desired for any particular application of the joint unit. For example, if the joint unit is to be used for making crystallographic models, said plug parts are formed with locating means (e.g. ridges and grooves) so that adjacent joint units can be stacked one on top of the other to model a close packed arrangement. Said locating means are not shown in FIGS. 1 and 3. In the embodiment shown in FIGS. 1–3 each plug comprises a circular base 16 with a three-faced pyramidal protuberance 17 formed on one face thereof; three part-sockets 15 are formed one on each of the three faces of this pyramid. This shape has the advantage that the binder 3 can be moulded as a single, integral unit in the 'flat' arrangement shown in FIG. 2. This reduces manufacturing costs.

The joint unit of FIGS. 1–3 provides up to six ball-and-socket joints. If fewer than six joints are needed, the surplus joints need not be used. Alternatively, the surplus joints may be 'blanked off' by replacing the ball of each surplus joint with a fixed sphere, which could form part of the binder 3.

It will be appreciated that the binder of FIGS. 1–3 is essentially self-centering on the balls, so that it is always a perfect fit in use.

Figure 4:
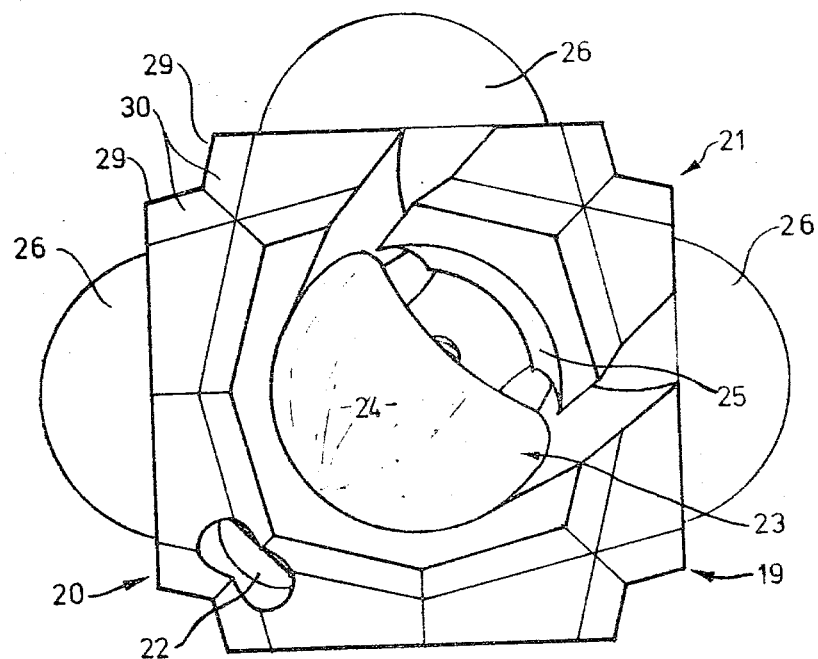
FIG. 4 shows a side view of an assembled joint unit in accordance with a second embodiment of the invention.
Figure 5:
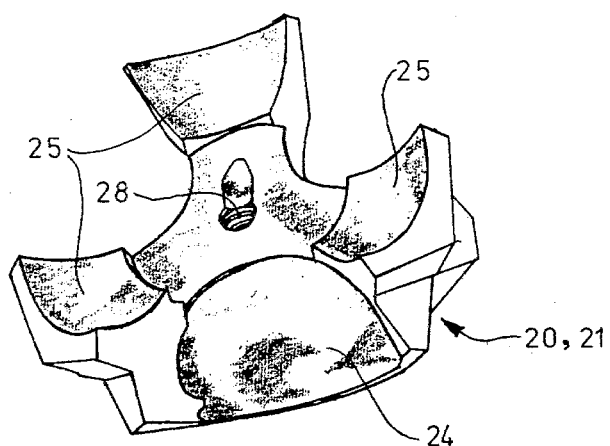
FIG. 5 shows a perspective view of one half of the binder of the joint unit of FIG. 4.

Turning now to FIGS. 4 and 5, a joint 19 provides six balls 26 arranged in a near-close-packed octahedral cluster, the balls being held in position by a binder formed from identical halves, 20,21 which also provide the sockets for six ball-and-socket joints. In FIG. 4, only three of the six balls 26 are shown, the other three balls have been removed to clarify the drawing. The joint unit 19 is perhaps easier to visualise as a cube which provides a ball-and-socket joint on each face. The cube is split into identical halves 20,21, said halves being secured together by a screw 22 which extends along one of the body diagonals of the cube, in an aperture 28 (FIG. 5).

A socket 23 for a ball-and-socket joint is formed in each face of the cube and provides a concave surface large enough to receive more than half of a spherical ball 26, so that the ball is held securely in place in the socket. Each socket 23 comprises a major concave part-spherical surface 24 formed in one of the halves 20,21, and a minor concave part-spherical surface 25 formed in the other said halves. Thus, (as shown in FIG. 5), both halves 20,21 each provide three surfaces 24 and three surfaces 25, and when the halves 20,21 are separated by loosening the screw 22, each of the sockets 23 is distorted and enlarged, and a ball 26 can be inserted into, or removed from, each socket. As the halves 20,21 are drawn towards each other by tightening the screw 22, all the sockets 23 are re-formed simultaneously, gripping the respective balls 26 in place and exerting a frictional force on said balls.

Preferably, as much material is removed from the outer surfaces of the cube as is compatible with providing enough material around each socket to grip the corresponding ball securely. Within this limit, the more material that can be removed, the better, because this allows a ball held in a socket to turn through greater angles relative to the socket.

Preferably also, each corner of the cube is formed with locating ridges 29 and grooves 30, so that the joint units can be stacked one on top of the other in a close-packed arrangement, with the ridges 29 of one unit meshing with the grooves 30 of the adjacent unit. Alternatively, other suitable locating means may be formed at said corners.

The joint unit 19 can be used to provide less than six ball-and-socket joints simply by omitting the required number of balls from the corresponding sockets. This does not weaken the joint unit nor does it decrease the frictional grip of the sockets on the remaining balls. The said frictional grip is sufficiently strong to permit a ball rotated to any described angle within the geometrical limitations of the unit, to remain in that position.

In use, either of the above-described joint units may be used to make closed or open frameworks for unit-cell models, geometrical models, or molecular models, by connecting a number of the units together by rods. Joint units 1 and 19 both provide ball-and-socket joints in which a ball with a rod secured to it can be rotated up to 180° relative to the socket. Indeed, if the rod is of small diameter relative to the ball diameter, so that the thickness of the rod does not unduly limit the rotation of the ball, the ball may be rotated up to 220° relative to its socket. In addition, both said joint units permit adjacent balls with rods secured thereto to be rotated in their respective sockets through a very large angular range relative to each other.

Figure 6:
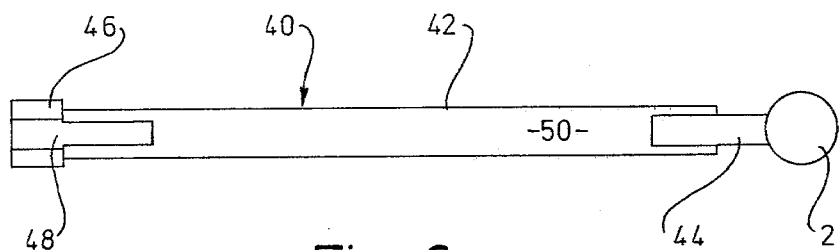
FIG. 6 shows a side view of one half of a preferred rod construction.

Each rod is secured at one or both ends to a ball of the appropriate ball-and-socket joint or joints. The rod may be screwed into an internally screw-threaded aperture in the ball, or may be a push-fit into a plain aperture in the ball. Some of the balls may have rods formed integrally therewith. Rods are provided in a selection of lengths, or may be adjustable in length. A preferred rod construction is shown in FIG. 6.

Each rod 40 comprises a pair of half-round bars 42 one end of each of which is securable to the ball 2 of a ball-and-socket joint by a stem 44 which has a cross-sectional radius less than the cross-sectional radius of the bar 42. The other end of each bar 42 is formed with a collar 46 having an internal diameter slightly less than the twice the cross-sectional radius of the bar 42. Each collar 46 has a gap 48 in its circumference sufficiently large to allow a stem 44 to enter.

The complete rod 40 is assembled by laying the flats 50 of the bars 42 together, aligning the collar 46 of one bar 42 with the stem 44 of the other bar 42 slipping the stems 44 through the gaps 48 into the collars, and then sliding the bars 42 relative to each other until the collar 46 of each bar surrounds and grips the other bar 42. The frictional force between the collars 46 and bars 42 is sufficient to allow the total length of the rod 40 to be adjusted as desired, but holes may also be provided through the bars 42 so that the rod 40 can be secured at any desired length. Said holes may be provided at Vernier spacing to allow fine adjustments of the length of the rod 40.

The stem 44 may be securable to the ball 2 by a screw-thread or as a push-fit, or the stem 44, ball 2, bar 42, and collar 46 may be integrally formed as a single component.

What we claim is:

1. A joint unit providing six ball-and-socket joints and comprising: six balls arranged as a substantially close-packed octahedral cluster; and a binder rotatably supporting said balls in position and providing a socket for each ball.

2. A joint unit as claimed in claim 1 wherein said binder comprises four plugs arranged one at each vertex of a tetrahedron, each plug being connected to the other three plugs by connector members, and each plug providing three equidistantly-spaced part-sockets such that each pair of adjacent part-sockets provided by each two adjacent plugs together provides one of the six sockets of the six ball-and-socket joints.

3. A joint unit as claimed in claim 2 wherein each plug is formed with locating means on a surface thereof not occupied by said part-sockets.

4. A joint unit as claimed in claim 2 wherein the connections between three adjacent plugs are openable and reclosable.

5. A joint unit as claimed in any one of claims 2-4 wherein said plugs are formed integrally with said connector members.

6. A joint unit as claimed in claim 1 wherein a preselected number of ball-and-socket joints are blanked off by substituting non-rotatable spheres for the balls in said preselected joints.

7. A joint unit as claimed in claim 1 wherein said binder comprises a cube divided into identical halves along a body diagonal, said halves being releasably secured together and each said half being shaped to provide three major socket portions and three minor socket portions; said socket portions being arranged such that each socket is formed from a major socket portion provided by one half and a minor socket portion provided by the other half.

8. A joint unit as claimed in claim 7 wherein the external corners of said cube are shaped to form locating means.

9. A joint unit as claimed in claim 7 wherein a preselected number of ball-and-socket joints are blanked off by removing the balls therefrom.

10. A joint unit as claimed in any one of claims 1, 2, and 7 wherein each ball is apertured to receive a rod as a push-fit therein.

11. A joint unit as claimed in any one of claims 1, 2 and 7 wherein a rod is formed integrally with a ball thereof.

12. A joint unit as claimed in any one of claims 1, 2, and 8 wherein each ball is formed with a screw-threaded aperture to secure one end of a screw-threaded rod.

13. A joint unit as claimed in any one of claims 1, 2, and 7 wherein each socket and/or each ball is formed with a roughened external surface to increase the friction between ball and socket.

14. The combination of a joint unit as claimed in any one of claims 1, 2, and 7 and a rod comprising a pair of half-round bars, each bar having an apertured collar secured to one end thereof and a stem secured to the other end thereof; the aperture in the collar being greater in width than the width of the stem, and the internal diameter of the collar being slightly greater than twice the radius of said bar, such that when said two bars are assembled with their flat faces opposed to form the rod, the collar of each bar fits tightly around the other bar and presses said bars together.

* * * * *